United States Patent
Ruppel et al.

(10) Patent No.: US 7,504,543 B2
(45) Date of Patent: Mar. 17, 2009

(54) POLYETHER ALCOHOLS AND METHOD FOR THE PRODUCTION OF POLYETHER ALCOHOLS FOR POLYURETHANE SYNTHESIS

(75) Inventors: Raimund Ruppel, Dresden (DE); Eva Baum, Schwarzheide (DE); Thomas Ostrowski, Mannheim (DE); Kathrin Harre, Dresden (DE); Elke Bleuel, Dresden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/590,999

(22) PCT Filed: Mar. 17, 2005

(86) PCT No.: PCT/EP2005/002848

§ 371 (c)(1),
(2), (4) Date: Aug. 29, 2006

(87) PCT Pub. No.: WO2005/090440

PCT Pub. Date: Sep. 29, 2005

(65) Prior Publication Data

US 2007/0173628 A1 Jul. 26, 2007

(30) Foreign Application Priority Data

Mar. 18, 2004 (DE) .................. 10 2004 013 408

(51) Int. Cl.
*C07C 41/03* (2006.01)
*C08G 18/00* (2006.01)
(52) U.S. Cl. .......................... 568/679; 528/76
(58) Field of Classification Search ...................... None
See application file for complete search history.

(56) References Cited

U.S. PATENT DOCUMENTS 3,829,505 A * 8/1974 Herold ...................... 568/606

FOREIGN PATENT DOCUMENTS

| DE | 203 735 | 12/1981 |
|---|---|---|
| EP | 0090444 | 10/1983 |
| EP | 0 705 872 | 4/1996 |
| EP | 0 759 450 | 2/1997 |
| EP | 0 862 947 | 9/1998 |
| WO | 99 51661 | 10/1999 |
| WO | 2004 106408 | 12/2004 |

* cited by examiner

*Primary Examiner*—Rosalynd Keys
(74) *Attorney, Agent, or Firm*—Oblon, Spivak, McClelland, Maier & Neustadt, P.C.

(57) ABSTRACT

The invention relates to polyether alcohols, to a process for preparing polyether alcohols by reacting alkylene oxides in the presence of a double metal cyanide (DMC) catalyst with at least one saturated OH component which may, if appropriate, have previously been reacted with an alkylene oxide, wherein an antioxidant is added before or during the reaction, and also to the further processing of the polyether alcohols to form polyurethanes.

20 Claims, No Drawings

POLYETHER ALCOHOLS AND METHOD FOR THE PRODUCTION OF POLYETHER ALCOHOLS FOR POLYURETHANE SYNTHESIS

The present invention relates to a process for preparing, by means of DMC catalysis, high-quality polyether alcohols which are suitable for the synthesis of polyurethanes, and also to the production of polyurethanes from these polyether alcohols.

Polyether alcohols are important raw materials for the production of polyurethanes and polyurethane foams. Polyether alcohols are usually prepared by catalytic addition of alkylene oxides onto OH-functional compounds. Catalysts used in industry are, in particular, alkali metal hydroxides or double metal cyanide catalysts (DMC catalysts). The use of DMC catalysts has the advantage that the addition reaction of alkylene oxides proceeds at a higher reaction rate and the formation of undesirable by-products is reduced compared to catalysis by means of alkali metal hydroxides. Processes for the synthesis of polyether alcohols by means of DMC catalysis are known and are described, for example in EP-B1-0862947, DD 203735 or WO 99/51661. Disadvantages of the use of DMC catalysts are firstly the high sensitivity of the DMC catalyst and secondly the difficult induction behavior of the initial reaction, which is reflected in a long induction time. The sensitivity of the DMC catalysts can frequently result in a reduction in the activity of the catalysts and thus to partial or complete inhibition of the reaction of the alkylene oxides. The reduced activity of the catalysts can lead not only to an uneconomical process but also to potentially unsafe states in the alkoxylation reactor. Furthermore, the amount of catalyst and/or the reaction temperature has to be increased to compensate for the decrease in activity. While small amounts of catalyst can, depending on the further use of the polyether alcohols, remain in the product, in the case of a reaction using an increased amount of catalyst, complicated purification steps have to be carried out to remove the catalyst constituents. In addition, the reduced catalyst activity can result in formation of polyether alcohols of poorer quality, i.e. having a relatively high number of impurities/by-products, in particular low molecular weight compounds, which can be separated off only with great difficulty, if at all. The further processing of such polyether alcohols to produce polyurethanes or flexible or rigid foams consequently likewise leads to products of lower quality, which can, for example, be reflected by outgassing of the by-products present in the polyether alcohols, in particular low molecular weight compounds (for example formaldehyde).

There is therefore a need for a process for preparing polyether alcohols by means of DMC catalysis, in which a decrease in the catalyst activity is prevented or at least reduced. Furthermore, there is a need for a process for preparing polyether alcohols by means of DMC catalysis which has a short induction time. There is also a need for a DMC-catalyzed process for preparing high-quality polyether alcohols in which only a small amount of catalyst is necessary, so that work-up steps for separating off the catalyst can be omitted. Likewise, there is a need for high-quality polyether alcohols which are suitable, in particular, for producing polyurethanes, preferably rigid and/or flexible foams, and which have only a small number of impurities, in particular low molecular weight compounds.

In EP-B1-0 090 444, it is stated that the storage stability of polyether alcohols prepared by means of DMC catalysis can be increased by addition of conventional antioxidants to the polyether alcohols prepared. A large number of such compounds are mentioned in EP-B1-0 090 444 and in the documents cited therein. It has now surprisingly been found that the addition of particular stabilizer compounds before and/or during the DMC-catalyzed polymerization step can reduce or even prevent a decrease in the activity of the catalyst and/or considerably reduce the induction time of the reaction. This makes the preparation of high-quality polyether alcohols possible.

The invention accordingly provides a process for preparing polyether alcohols by reacting saturated alkylene oxides with at least one saturated OH compound, or an alkylene oxide which has previously been oligomerized or polymerized with the saturated OH compound, in the presence of a double metal cyanide (DMC) catalyst. In the process of the invention, an antioxidant is added before or during the reaction, using more antioxidant than DMC catalyst (based on the mass of DMC catalyst used).

The invention further provides polyether alcohols which can be prepared in this way and have an OH functionality of from 1 to 8, a hydroxyl number of preferably from 30 to 300 mg KOH/g, a DMC catalyst concentration of preferably from 10 to 1000 ppm and further comprise an antioxidant in an amount which is at least 1.5 times the mass of the DMC catalyst.

The invention likewise provides a process for producing polyurethanes, which comprises the following steps:
A) preparation of polyether alcohols by the above process,
B) reaction of the polyether alcohols from step A) with isocyanates and/or polyisocyanates to form polyurethanes.

For the purposes of the present invention, polyether alcohols are compounds which have more than one ether function and at least one alcohol function. The polyether alcohols prepared by the process of the invention are preferably employed for producing polyurethanes. The polyether alcohols can be prepared in the reaction of alkylene oxides with OH-functionalized compounds (i.e. saturated OH compounds or alkylene oxides which have previously been oligomerized or polymerized with the saturated OH compound). The polyether alcohols preferably have an average OH functionality of from 1 to 8, more preferably from 1.5 to 6.5, particularly preferably from 2 to 6. Furthermore, the polyether alcohols preferably have a hydroxyl number of from 10 to 350 mg KOH/g, more preferably from 30 to 300 mg KOH/g. The hydroxyl number is determined by standard methods (cf. Römpp, Lexikon der Chemie, Volume 3, $10^{th}$ edition, page 1852, Thieme Verlag 1997). The polyether alcohols preferably have a viscosity, determined in accordance with DIN 53015 at 25° C., of from 50 to 5000 mPas.

The OH-functionalized compounds for the purposes of the invention are saturated alcohols; the suitable OH-functionalized compounds are preferably monohydric, dihydric or polyhydric, aliphatic, aromatic, linear, cyclic, straight-chain and/or branched saturated alcohols, for example ethanol, propanol, sugar alcohols or sugars such as hydrolyzed starch and glucose syrup. Hydroxy compounds containing further functions, for example hydroxycarboxylic acids, hydroxyaldehydes, hydroxyketones or amino alcohols are likewise suitable as long as the further function is suitable for DMC catalysis. The further function is preferably sterically hindered. In this context, sterically hindered means that at least one position, preferably both positions, adjacent to the function is/are substituted by alkyl and/or aryl groups. An alkyl substituent may preferably have from 1 to 16 carbon atoms and can be saturated, linear or cyclic, branched or unbranched.

Alcohols having from 2 to 8 hydroxyl groups, preferably aliphatic and cycloaliphatic alcohols having from 2 to 8 carbon atoms in the branched or unbranched alkyl chain or in the cycloaliphatic framework are typically used for the purposes of the present invention. Particular preference is given, for the purposes of the invention, to polyfunctional alcohols selected from the group consisting of glycerol, trimethylolpropane, pentaerythritol, dipentaerythritol and tripentaerythritol, sorbitol, sucrose, ethylene glycol and its homologues, e.g. diethylene glycol, propylene glycol and its homologues, e.g. dipropylene glycol, 1,3-propanediol, 1,2-, 1,3-, 2,3- and 1,4-butanediol and pentanediols and hexanediols, e.g. 1,5-pentanediol and 1,6-hexanediol. Both low molecular weight alcohols (i.e. alcohols having from 1 to 8 carbon atoms) and relatively high molecular weight alcohols are suitable. OH compounds which are likewise suitable for the purposes of the invention are alkylene oxides which have previously been oligomerized or polymerized with one or more OH compounds. Such oligomerized or polymerized OH compounds can also have been previously prepared separately using catalysts other than DMC catalysts. The OH compounds can be reacted individually or as a mixture with alkylene oxides, alkylene oxide mixtures together, in succession, in blockwise form or randomly in the presence of the DMC catalyst.

It is also possible to use H-functional compounds together with the OH compounds. H-functional compounds are compounds which have at least one H-functional group and react with alkylene oxides or polyalkylene oxides under DMC catalysis without inactivating the catalyst and are preferably saturated.

It is in principle possible to use all saturated alkylene oxides which are suitable for DMC catalysis. Suitable alkylene oxides are, for example, ethylene oxide, propylene oxide, butylene oxide, isobutylene oxide and mixtures thereof. Preference is given to using ethylene oxide and propylene oxide and mixtures thereof.

The alkylene oxides can be added on either individually or in the form of blocks and, when using more than two different alkylene oxides, in any mixing ratio as mixed blocks. Furthermore, the mixing ratio of the alkylene oxides can be varied continuously or discontinuously during the addition in the synthesis. After activation has occurred, further OH-functional compounds may, if appropriate, be introduced in parallel to the alkylene oxide, as described, for example, in DD 203734/735. The structure of the polyether chain can be varied according to the use to which the polyether alcohols are to be put. Thus, in the case of polyether alcohols which are to be used for flexible polyurethane slab stock foams, preference is given to adding on a block which consists essentially of, preferably consists entirely of, propylene oxide at the end of the chain. In the case of polyether alcohols which are to be used for molded flexible polyurethane materials, preference is given to adding on a block consisting essentially of, preferably consisting entirely of, ethylene oxide at the end of the chain.

Saturated compounds which can be polymerized with alkylene oxides can in principle also be used as long as they have no functions which inhibit or poison the DMC catalyst. Suitable compounds of this type are, for example, unsubstituted or substituted, for example halogen-substituted, $C_5$-$C_{12}$-olefin oxides, oxetanes, lactones and/or anhydrides, e.g. methyloxetane, caprolactone, maleic anhydride and/or phthalic anhydride.

The reaction of the alkylene oxides can proceed under the conditions customary for the preparation of polyether alcohols, as are described, for example, in the Kunststoffhandbuch, Volume 7 "Polyurethane", edited by Gunter Oertel, Karl Hanser Verlag, Munich, 1993, 3$^{rd}$ edition, pages 63 to 65.

The preparation is preferably carried out under a protective gas atmosphere, in particular under a nitrogen and/or argon atmosphere.

The addition of alkylene oxides onto low molecular weight OH-functional compounds and/or H-functional compounds, in particular alcohols having from 2 to 8 carbon atoms, preferably takes place at pressures in the range from 1 to 20 bar, in particular from 2 to 10 bar, and temperatures in the range from 60 to 140° C., in particular from 80 to 130° C.

The commencement of the reaction is indicated by an increase in temperature and pressure. The induction time for the reaction is measured from the time of addition of the reactants to the time at which a temperature maximum or pressure maximum is reached, with the first maximum which occurs, either a temperature maximum or a pressure maximum, being utilized to determine the induction time.

For the purposes of the invention, it is in principle possible to use all types of DMC catalysts known from the prior art. Preference is given to using double metal cyanide catalysts of the general formula (1):

$$M^1{}_a[M^2(CN)_b(A)_c]_d \cdot fM^1gX_n \cdot h(H_2O) \cdot eL, \qquad (1)$$

where $M^1$ is a metal ion selected from the group comprising $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{6+}$, $Cr^{2+}$, $Cr^{3+}$, $Cd^{2+}$, $M^2$ is a metal ion selected from the group comprising $Fe^{2+}$, $Fe3+$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$, $M^1$ and $M^2$ are identical or different, A is an anion selected from the group comprising halide, hydroxide, sulfate, carbonate, cyanide, thiocyanate, isocyanate, cyanate, carboxylate, oxalate and nitrate, X is an anion selected from the group comprising halide, hydroxide, sulfate, carbonate, cyanide, thiocyanate, isocyanate, cyanate, carboxylate, oxalate and nitrate, L is a water-miscible ligand selected from the group comprising alcohols, aldehydes, ketones, ethers, polyethers, esters, ureas, amides, nitriles, sulfides, and a, b, c, d, g and n are selected so that the compound is electrically neutral and e is the coordination number of the ligand or zero, f is a fraction or integer greater than or equal to zero, h is a fraction or integer greater than or equal to zero.

Such compounds are generally known and can be prepared, for example, by the process described in EP-B1-0 862 947 by combining the aqueous solution of a water-soluble metal salt with the aqueous solution of a hexacyanometalate compound, in particular of a salt or an acid, and, if necessary, adding a water-soluble ligand thereto either during or after the combination of the two solutions.

DMC catalysts are usually prepared as a solid and used as such. The catalyst is typically used as powder or in suspension. However, other ways known to those skilled in the art for using catalysts can likewise be employed. In a preferred embodiment, the DMC catalyst is dispersed with an inert or noninert suspension medium which can be, for example, the product to be produced or an intermediate by suitable measures, e.g. milling. The suspension produced in this way is used, if appropriate after removal of interfering amounts of water by methods known to those skilled in the art, e.g. stripping with or without use of inert gases such as nitrogen and/or noble gases. Suitable suspension media are, for example, toluene, xylene, tetrahydrofuran, acetone, 2-methylpentanone, cyclohexanone and also polyether alcohols according to the invention and mixtures thereof. The catalyst is preferably used in a suspension in a polyol as described, for example, in EP-A-0 090 444.

In the polyether alcohol synthesis of the invention, use is typically made of from 5 to 1000 ppm, preferably from 10 to 500 ppm, of DMC catalyst, in each case based on the mass of the end product expected.

For the purposes of the invention, an antioxidant is one or more compounds which is (are) suitable for inhibiting the autooxidation of polyether alcohols. Antioxidants for the purposes of the invention are therefore free-radical scavengers and/or peroxide decomposers and/or metal ion deactivators. These are typically compounds which are used for increasing the storage stability of polyether alcohols. The antioxidant is preferably an organic compound. In addition, the antioxidants for the purposes of the invention are compounds which are suitable for the DMC-catalyzed synthesis of polyethers. Suitable antioxidants for the purposes of the invention are one or more compounds selected from the group consisting of
  (i) sterically hindered phenols and/or
  (ii) N,N-disubstituted hydroxylamine and/or
  (iii) cyclic amines and/or
  (iv) diarylamines and/or
  (v) organic phosphites and phosphonites, and/or organic phosphonic acid derivatives, and/or
  (vi) N,N-substituted hydrazine compounds and amide compounds of oxalic acid and/or
  (vii) lactones and/or
  (viii) benzofurans.

Compounds of the group (i) are, for example
(i)a tocopherols:
  for example α-tocopherol, β-tocopherol, γ-tocopherol, δ-tocopherol and mixtures thereof;
(i)b phenols which are substituted by alkyl radicals in at least two positions, preferably at least in the 2 and 4 positions, of the phenol ring, where the alkyl radicals can be linear, branched or cyclic and preferably each have from 1 to 16 carbon atoms. Such phenols are, for example, trialkylated monophenols such as:
  2,6-di-tert-butyl-4-methylphenol, 2-butyl-4,6-dimethylphenol, 2,6-di-tert-butyl-4-methoxyphenol, 2,6-di-tert-butyl-4-ethylphenol, 2,6-di-tert-butyl-4-n-butylphenol, 2,6-di-tert-butyl-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side chain, e.g. 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl) phenol and mixtures thereof;
(i)c alkylthioalkylphenols:
  for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol and mixtures thereof;
(i)d thioethers of diphenols, for example compounds in which the phenol units each bear alkyl radicals in two or three positions on the ring, where the alkyl radicals can be linear, branched or cyclic and preferably each have from 1 to 16 carbon atoms, for example:
  2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-disec-amylphenol), 4,4'-bis(2,6-dimethyl-4-hydroxyphenyl) disulfide and mixtures thereof;
(i)e alkylidenebisphenols, for example compounds in which the phenol units each bear alkyl radicals in two or three positions on the ring, where the alkyl radicals can be linear, branched or cyclic and preferably each have from 1 to 16 carbon atoms and may also bear further substituents, for example 2,2'-methylenebis(6-tert-butyl-4-methylphenol), 2,2'-methylenebis(6-tert-butyl-4-ethylphenol), 2,2'-methylenebis(6-tert-butyl-4-butylphenol), 2,2'-methylenebis[4-methyl-6-(α-methylcyclohexyl)phenol)], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol, 2,2'-methylenebis[6-(α,α-dimethylbenzyl)-4-nonylphenol), 1,1-bis(5-tert-butyl-4-hydroxy-2-methylphenyl)butane, 2,6-bis(3-tert-butyl-5-methyl-2-hydroxy-benzyl)-4-methylphenol, 1,1,3-tris(5-tert-butyl-4-hydroxy-2-methyl-phenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)-dicyclopentadiene, 1,1-bis(3,5-dimethyl-2-hydroxyphenyl)butane, 2,2-bis(3,5-di-tert-butyl-4-hydroxyphenyl)propane, 2,2-bis(3,5-di-tert-butyl-4-hydroxy-2-methylphenyl)-4-n-dodecylmercaptobutane, 1,1,5,5-tetra(5-tert-butyl-4-hydroxy-2-methylphenyl)pentane, and also, for example, methyl (3,5-di-tert-butyl-4-hydroxyphenyl)propionate, octadecyl (3,5-di-tert-butyl-4-hydroxyphenyl)propionate, N,N'-hexamethylenebis(3,5-di-tert-butyl-4-hydroxyhydrocinnamide), tetrakis[methylene(3,5-di-tert-butyl-4-hydroxycinnamic acid)]methane, 2,2'-oxamidobis [ethyl-3-(3,5-di-tert-butyl-4-hydroxyphenyl]propionate, tris(3,5-di-tert-butyl-4-hydroxybenzyl) isocyanurate and mixtures thereof.

Compounds of group (ii) are, for example:
N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines and mixtures thereof.

Compounds of group (iii) are, for example:
cyclic, secondary amines which are alkylated adjacent to the nitrogen function, for example alkylated piperidines such as 2,2,6,6-tetramethylpiperidine, N-methyl-2,2,6,6-tetramethylpiperidine, 4-hydroxy-2,2,6,6-tetramethylpiperidine, bis(2,2,6,6-tetramethyl-4-piperidyl) sebacate, bis(N-methyl-2,2,6,6-tetramethyl-4-piperidyl) sebacate and mixtures thereof; and/or Compounds of group (iv) are, for example:
diphenylamines, butyldiphenylamines, octyldiphenylamines, N-allyldiphenylamine, 4-isopropoxy-N,N-diphenylamine, 4-dimethylbenzyl-N,N-diphenylamine, N-phenyl-2-naphthylamine, N-phenyl-1-naphthylamine and mixtures thereof.

Compounds of group (v) are, for example:
alkyl and/or aryl phosphites and phosphonates, for example triphenyl phosphite, diphenyl alkyl phosphites, phenyl dialkyl phosphites, tris(nonylphenyl) phosphite, trilauryl phosphite, trioctadecyl phosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, bisisodecyloxy pentaerythrityl diphosphite, bis(2,4-di-tert-butyl-6-methylphenyl) pentaerythrityl diphosphite, bis(2,4,6-tri-tert-butylphenyl) pentaerythrityl diphosphite, tristearyl sorbityl triphosphite, tetrakis(2,4-di-tert-butylphenyl)-4,4'-biphenylenediphosphite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyidibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite and mixtures thereof.

Compounds of group (vi) are, for example:

N,N'-substituted or disubstituted hydrazine derivatives, arylated diamides of oxalic acid and/or arylated salicylic acid derivatives, for example:

N,N'-diphenyloxamide, N-salicylal-N'-salicyloylhydrazine, N, N'-bis(salicyloyl)hydrazine, N,N'-bis(3,5-di-tert-butyl-4-hydroxyphenyl-propionyl)hydrazine, 3-salicyloylamino-1,2,4-triazole, bis(benzylidene)(oxalic dihydrazide), oxanilide, isophthalic dihydrazide, sebacic bis(phenylhydrazide), N,N'-diacetyl(adipic dihydrazide), N,N'-bis(salicyloyl)(oxalic dihydrazide), N,N'-bis(salicyloyl)(thiopropionic dihydrazide) and mixtures thereof.

Compounds of group (vii) are, for example, the benzofuranones as described in EP-A1-1 291 384 or EP-B1-0 644 190.

The antioxidant can be added all at once or stepwise. It is likewise possible to add a plurality of antioxidants individually, stepwise or all at once. An antioxidant made up of a mixture of compounds within one of the groups (i) to (viii) or a mixture of compounds of various groups is likewise suitable.

Preference is given to antioxidants which are simple to separate off in the work-up process and/or are suitable for the polyurethane synthesis so that they can remain in the polyether alcohol and the process can be carried out without a work-up step for removing the antioxidant.

The antioxidant is added prior to the DMC-catalyzed reaction of the alkylene oxides with the OH compound or compounds. The addition is preferably effected before process steps in which a temperature of more than 50° C., either as a result of external heating or as a result of heat liberated, can occur are carried out; such steps are, in particular: (a) addition of the OH compound, (b) addition of the DMC catalyst, (c) milling of the DMC catalyst, (d) removal of suspension media, (e) removal of water, (f) addition of alkylene oxide, (g) reaction of alkylene oxide with OH compound. Preference is given to an addition of antioxidant immediately before the following process steps: introduction of the DMC catalyst, introduction of the OH compound, introduction of the alkylene oxides, if present: milling of solid DMC catalysts using inert or noninert suspension media, removal of the suspension medium, dewatering.

The antioxidant can be used in an amount of from 7 to 4000 ppm per compound, preferably 10 to 4000 ppm per compound, more preferably from 20 to 3000 ppm per compound, based on the mass of polyether alcohol to be prepared. The antioxidant is used in a total amount which is greater than that of the DMC catalyst, with the term "amount" referring to the mass of the catalyst. Preference is given to a mass ratio of antioxidant to DMC catalyst of greater than 1, based on the mass of the catalyst used. Preference is given to using an amount of antioxidant which is at least 1.5 times, more preferably from 1.5 to 1000 times, most preferably from 2 to 500 times, the mass of catalyst used.

If appropriate, further and/or other antioxidants can be added for the storage and further processing of the products in the customary amounts known to those skilled in the art.

The polyether alcohols prepared according to the invention can preferably be used for producing polyurethanes, for example in the form of rigid or flexible foams, embedding compositions, coatings or crosslinkers. The polyurethanes can be produced by methods known per se by reacting the polyether alcohols with isocyanates or polyisocyanates, as described, for example, in Kunststoff-Handbuch, Volume VII, "Polyurethane", $3^{rd}$ edition, 1993, edited by Dr. G. Oertel (Carl Hanser Verlag Munich). Depending on the desired properties of the polyurethanes, it is possible to use the polyether alcohols of the invention either alone or together with other compounds having at least two hydrogen atoms which are reactive toward isocyanate groups. As compounds which have at least two hydrogen atoms which are reactive toward isocyanate groups and can be used together with the polyether alcohols of the invention for the reaction with polyisocyanates include polyester alcohols and, if appropriate, bifunctional or polyfunctional alcohols and amines having a molecular weight in the range from 62 to 1000 g/mol, known as chain extenders and crosslinkers. It is also possible to use catalysts, blowing agents and the customary auxiliaries and/or additives.

The invention is illustrated by the following examples.

EXAMPLES

Example 1

Comparative Example 0.03 g of a DMC catalyst (corresponding to 150 ppm) prepared as described in Example 1 of EP-B1-0 862 947 was added to 10 g of a polypropylene glycol having a molecular weight ($M_w$) of 400 g/mol, hereinafter referred to as PPG 400, and dispersed by means of an Ultra-Turrax T25 dispersing apparatus from IKA for 5 minutes to give a concentrate. A further 120 g of PPG 400 were added and the mixture was homogenized again for 5 minutes by means of the Ultra-Turrax. This PPG 400/DMC mixture was then placed in a stirring autoclave and evacuated at 100° C. and 3 mbar for 2 hours. 70 g of propylene oxide were subsequently introduced at 130° C. After the temperature and pressure had risen, the maxima were recorded and the induction time of the reaction, which at the same time serves as a measure of the catalytic activity, was determined therefrom. The point in time chosen for determining the induction time was the time at which a first maximum (either of the temperature or of the pressure) was reached. After all the propylene oxide had reacted, which could be recognized by the pressure dropping to a constant level, the autoclave was made inert by means of nitrogen and the polyether alcohol was drained from the autoclave and analyzed.

Example 2

The procedure was as in Example 1, except that 0.2 g (1000 ppm) of 2,6-di-tert-butyl-4-methylphenol (BHT) was added to the reaction mixture immediately after the evacuation phase.

Example 3

The procedure was as in Example 1, except that 0.2 g (1000 ppm) of BHT was added to the reaction mixture prior to the evacuation phase.

Example 4

The procedure was as in Example 1, except that 0.2 g (1000 ppm) of α-tocopherol was added to the reaction mixture after the evacuation phase.

Example 5

The procedure was as in Example 1, except that 0.1 g (500 ppm) of N,N-dihexadecylhydroxylamine was added to the reaction mixture after the evacuation phase.

Example 6

The procedure was as in Example 1, except that 0.1 g (500 ppm) of triphenyl phosphite was added to the reaction mixture after the evacuation phase.

Example 7

The procedure was as in Example 1, except that 0.5 g (2000 ppm) of N,N-diphenyloxamide was added to the reaction mixture after the evacuation phase.

Example 8

Comparative Example

The procedure was as in Example 1, except that the reaction was carried out using 0.005 g (25 ppm) of DMC catalyst.

Example 9

The procedure was as in Example 8, except that 0.05 g (250 ppm) of BHT was added to the reaction mixture immediately after the evacuation phase.

Example 10

The procedure was as in Example 8, except that 0.05 g (250 ppm) of BHT was added to the reaction mixture prior to the evacuation phase.

Example 11

The procedure was as in Example 8, except that 0.01 9 (50 ppm) of BHT was added to the reaction mixture immediately after the evacuation phase.

Example 12

Comparative Example

In a 20 l stirred tank reactor, 3200 g of a glycerol propoxylate having a mean molar mass of about 1000 g/mol were admixed with 11 g of a 5.53% strength DMC catalyst suspension and the mixture was dewatered at 120° C. and a vacuum of about 40 mbar until the water content was below 0.02%. About 400 g of propylene oxide were subsequently introduced and the commencement of the reaction was awaited, which was able to be recognized after 21 minutes by a brief increase in the temperature and a rapid drop in the reactor pressure. 16 450 g of a mixture of 14910 g of propylene oxide and 1940 g of ethylene oxide were subsequently metered in over a period of about 2.5 hours. After a constant reactor pressure had been reached, unreacted monomers and other volatile constituents were distilled off under reduced pressure and the product was drained off. The colorless polyether alcohol obtained had the following properties: OH number: 49.4 mg KOH/g, acid number: 0.053 mg KOH/g, water content: 0.011%, viscosity (25° C.): 716 mPas, $M_w$: 4704 g/mol, D: 1.381.

Example 13

The procedure was as in Example 12, except that 10 g of BHT (500 ppm, based on the final amount) were added to the reaction mixture after making the autoclave inert. The commencement of the reaction was recorded after only 3 minutes. The colorless polyether alcohol obtained had the following properties: hydroxyl number (OH number): 48.2 mg KOH/g, acid number: 0.027 mg KOH/g, water content: 0.009%, viscosity (25° C.): 543 mPas, molecular weight ($M_w$): 3844 g/mol, density (D): 1.101.

The results of Examples 1 to 11 are shown in Table 1.

TABLE 1

| Example | Amount of DMC [PPM] | Stabilizer | Amount [ppm] | Induction time (min) |
|---|---|---|---|---|
| 1 | 150 | — | — | 14 |
| 2 | 150 | BHT | 1000 | 4 |
| 3 | 150 | BHT | 1000 | 5 |
| 4 | 150 | alpha-Tocopherol | 1000 | 5 |
| 5 | 150 | Dihexadecylhydroxylamine | 500 | 7 |
| 6 | 150 | Triphenyl phosphite | 500 | 4 |
| 7 | 150 | Diphenyloxamide | 2000 | 2 |
| 8 | 25 | — | — | 27 |
| 9 | 25 | BHT | 250 | 6 |
| 10 | 25 | BHT | 250 | 5 |
| 11 | 25 | BHT | 50 | 10 |

The invention claimed is:

1. A process for preparing a polyether alcohol component, which is at least one polyether alcohol, comprising reacting at least one saturated alkylene oxide with (1) at least one saturated OH compound, or (2) an alkylene oxide that has previously been oligomerized or polymerized with the saturated OH compound, in the presence of a double metal cyanide (DMC) catalyst, wherein at least one antioxidant is added before the reaction, using more antioxidant than DMC catalyst (based on the mass of DMC catalyst used), wherein the amount of antioxidant is from 2 to 500 times the mass of catalyst used.

2. The process according to claim 1, wherein the antioxidant is selected from the group consisting of sterically hindered phenols, N,N-disubstituted hydroxylamines, sterically hindered secondary cyclic amines, diarylamines, organic phosphonic acid derivatives, N,N-substituted hydrazine compounds, oxamide compounds, benzofurans and lactones.

3. The process according to claim 1, wherein the antioxidant is used in a concentration of from 7 to 4000 ppm, based on the mass of polyether alcohol component to be prepared.

4. The process according to claim 1, wherein the antioxidant is added immediately before one of the following process steps (a) to (g): (a) addition of the OH compound, (b) addition of the DMC catalyst, (c) milling of the DMC catalyst, (d) removal of suspension media, (e) removal of water, (f) addition of alkylene oxide, and (g) reaction of alkylene oxide with OH compound.

5. The process according to claim 1, wherein the amount of double metal cyanide catalyst is from 5 to 1000 ppm, based on the mass of the polyether alcohol component to be prepared.

6. The process according to claim 1, wherein the polyether alcohol component has a hydroxyl number of from 10 to 350 mg KOH/g.

7. The process according to claim 1, wherein the polyether alcohol component has an OH functionality of from 1 to 8.

8. A polyether alcohol prepared by a process according to claim 1, having an OH functionality of from 1 to 8, a hydroxyl number of from 30 to 300 mg KOH/g, and a DMC catalyst concentration of from 10 to 1000 ppm and further comprising an antioxidant in an amount that is from 2 to 500 times the mass of the DMC catalyst.

9. A process for producing polyurethanes, comprising the following steps:
  A) preparing a polyether alcohol component by a process according to claim 1, and
  B) reacting the polyether alcohol component from step A) with one or more isocyanates and/or polyisocyanates to form polyurethanes.

10. The process according to claim 1, wherein at least one saturated alkylene oxide is reacted with (1) said at least one saturated OH compound.

11. The process according to claim 1, wherein at least one saturated alkylene oxide is reacted with (2) said alkylene oxide that has previously been oligomerized or polymerized with the saturated OH compound.

12. The process according to claim 1, wherein the amount of antioxidant is from 2 to 10 times the mass of catalyst used.

13. The process according to claim 1, wherein the amount of antioxidant is from 2 to 13⅓ times the mass of catalyst used.

14. The process according to claim 1, wherein the amount of antioxidant is from 2 to 3⅓ times the mass of catalyst used.

15. The process according to claim 1, wherein the amount of antioxidant is from 2 to 6⅔ times the mass of catalyst used.

16. The process according to claim 7, wherein the polyether alcohol component has an OH functionality of from 2 to 6.

17. The process according to claim 5, wherein the amount of double metal cyanide catalyst is from 10 to 500 ppm, based on the mass of the polyether alcohol component to be prepared.

18. The process according to claim 5, wherein the amount of double metal cyanide catalyst is from 25 to 150 ppm, based on the mass of the polyether alcohol component to be prepared.

19. The process according to claim 1, wherein the antioxidant is used in a concentration of from 50 to 1000 ppm, based on the mass of polyether alcohol component to be prepared.

20. The process according to claim 1, wherein the antioxidant is selected from the group consisting of BHT, alpha-tocopherol, dihexadecylhydroxylamine, triphenyl phosphite and diphenyloxamide.

* * * * *